US008620268B2

(12) United States Patent
Métivier

(10) Patent No.: US 8,620,268 B2
(45) **Date of Patent: *Dec. 31, 2013**

(54) SECURE SYSTEM FOR PROGRAMMING ELECTRONICALLY CONTROLLED LOCKING DEVICES BY MEANS OF ENCRYPTED ACOUSTIC ACCREDITATIONS

(75) Inventor: Pascal Métivier, Feucherolles (FR)

(73) Assignee: Openways SAS, Feucherolles (FR)

( * ) Notice: Subject to any disclaimer, the term of this patent is extended or adjusted under 35 U.S.C. 154(b) by 41 days.

This patent is subject to a terminal disclaimer.

(21) Appl. No.: 13/388,779

(22) PCT Filed: Jul. 16, 2010

(86) PCT No.: PCT/FR2010/051501

§ 371 (c)(1), (2), (4) Date: Mar. 2, 2012

(87) PCT Pub. No.: WO2011/015749

PCT Pub. Date: Feb. 10, 2011

(65) Prior Publication Data

US 2012/0157080 A1 Jun. 21, 2012

(30) Foreign Application Priority Data

Aug. 5, 2009 (EP) .................................... 09167248

(51) Int. Cl.
*H04M 1/66* (2006.01)

(52) U.S. Cl.
USPC ........... 455/410; 455/411; 455/418; 455/419; 455/414.1; 455/550.1

(58) Field of Classification Search
USPC ................. 455/410, 411, 418, 419, 420, 425, 455/550.1
See application file for complete search history.

(56) References Cited

U.S. PATENT DOCUMENTS 5,933,090 A 8/1999 Christenson

FOREIGN PATENT DOCUMENTS

| | | |
|---|---|---|
| WO | WO 03/093997 | 11/2003 |
| WO | WO 2007/046804 | 4/2007 |
| WO | WO 2008/107595 | 9/2008 |

OTHER PUBLICATIONS

International Search Report for PCT/FR2010/051501 mailed Nov. 9, 2010.

*Primary Examiner* — Kathy Wang-Hurst
(74) *Attorney, Agent, or Firm* — Nixon & Vanderhye P.C.

(57) ABSTRACT

The invention relates to a system implementing a mobile telephone (20) to which a master user authorized to program a lock (22) has access. A remote management site (10) includes a database (12) of locks and authorized users, having, for each lock, a list of authorized users with corresponding access rights, as well as an accreditation data generator (14). The accreditations are encrypted acoustic accreditations in the form of single-use audio signals, suitable for programming locks indexed in the database by the access rights indexed in the database and/or by additional data. The system includes a means for securely transmitting the encrypted acoustic accreditations from the management site to the mobile telephone of the master user. The lock (22) includes an electro-acoustic transducer (54) that is suitable for picking up acoustic accreditations reproduced by the telephone placed beforehand near the lock, as well as a means for recognizing, analyzing and authenticating the picked-up acoustic accreditations, and for programming access rights and/or additional data upon recognizing a compliant accreditation.

16 Claims, 1 Drawing Sheet

Figure 1:
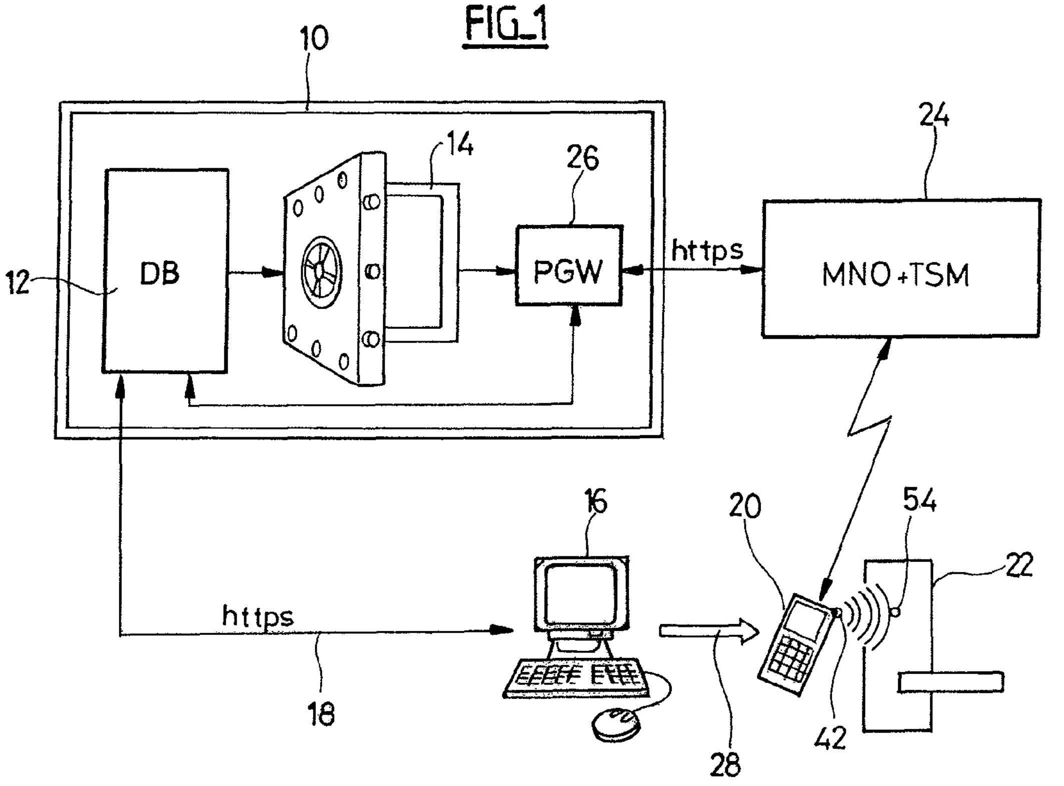

SECURE SYSTEM FOR PROGRAMMING ELECTRONICALLY CONTROLLED LOCKING DEVICES BY MEANS OF ENCRYPTED ACOUSTIC ACCREDITATIONS

This application is the U.S. national phase of International Application No. PCT/FR2010/051501 filed 16 Jul. 2010 which designated the U.S. and claims priority to EP 09167248.5 filed 5 Aug. 2009, the entire contents of each of which are hereby incorporated by reference.

The invention relates to the lock devices electrically controlled by means of a portable object acting as a key, such as a contactless card or badge, or also a mobile phone equipped with means (of the inductive, radiofrequency, acoustic type . . . ) for the coupling to the lock.

As used herein, "lock device" means not only a lock strictly speaking, i.e. a mechanism applied for example on a door so as to prevent the opening thereof, but also any device making it possible to obtain a comparable result, for example a lock barrel considered solely, or a more specific locking device comprising various members not grouped together in a same lock case, the final purpose being to prevent, through mechanical means, the physical access to a given place or space, and to allow access to that place or space through unlocking of the lock device, upon a request from the user, after having checked that this user has actually the access rights (i) that are peculiar to him and (ii) that are peculiar to the lock device. The lock device may also comprise, or be associated with, an alarm system that must be deactivated to allow access to a given space, or conversely, activated to protect this space before or after having leaving it.

For the simplicity of the description, it will be hereinafter simply referred to a "lock", but this term has to be understood in its wider sense, without any limitation to a particular type of equipment.

The invention relates more precisely to the programming of those locks with the "access rights" that correspond to them, i.e. the indication of the users that are authorized to open this or that lock, with for each one a definition of the rights that are peculiar to him, wherein such rights can be for example limited in time (lapsing of the access right), or limited to certain days of the week, or to certain time slots, etc.

In certain systems, each lock is connected to a network for a centralized management of the accesses and the rights checking. Such systems are well adapted to business or hotel environment, but far less adapted to residential applications, or to the modernization of pre-existing equipments in which it would be hardly conceivable to create a local network, with notably all the wiring difficulties that would involve.

The invention is more particularly, but not exclusively, aimed at another type of equipment, in which the locks are self-standing devices, each of which internally memorize the access rights that are attached thereto (authorized users and, for each one, potential access restrictions).

The programming of this type of lock involves the on-site intervention of an operator (hereinafter referred to as "master-user") having a device that can be coupled to the lock to write or to update the access rights therein. The update may also relates to various other operating parameters of the lock, such as date and time, identification data, calculation algorithms, cryptographic elements, etc.

In practice, programming such self-standing locks is a tricky operation, requiring specific and expensive equipment as well as previous learning, obliging most of time to appeal to a professional operator.

Those drawbacks are a significant brake to the deployment of such self-standing lock devices.

In this respect, it would be desirable to have available a programming means, which is simple to implement and which does not need a specific equipment, so that the programming can be made by simple operations, within the ability of everybody.

This would notably make it possible to develop residential applications, where the customers want to be able to program themselves the locks they have acquired, and/or to update these latter themselves without having to appeal to a professional, in particular each time it is necessary to modify the access rights or to create new ones.

One object of the invention is to propose a new method of programming such locks, which can be easily implemented by means of a mobile phone, and in a manner simple enough to be within the ability of a non-professional master-user of average skill.

Another object of the invention is to propose a lock programming method showing a maximum security level, a very high flexibility of implementation, and which can be used with any pre-existing conventional mobile phone, without the need for the master-user to use a particular programming device. The system of the invention will thus be immediately generalizable and usable by everybody, with the security and the flexibility peculiar to the modern cryptographic methods.

The principle of the invention lies in the use of encrypted acoustic accreditations for programming the lock. Such acoustic accreditations are, for example, in the form of a coded series of tones (DTMF tones or others), emitted by the loudspeaker of an emitting device and picked up by the microphone of a receiving device.

In the case of the invention, such encrypted acoustic accreditations are "downward" accreditations, i.e. they come from a remote management site and are transmitted to the mobile phone of the master-user. To use the accreditation, the master-user brings his phone in the vicinity of the lock and triggers the emission of the series of tones corresponding to the encrypted acoustic accreditation by the loudspeaker of his phone, so that these tones can be picked up by a microphone incorporated in the lock or coupled thereto. The latter decodes the accreditation, checks it and, in case of compliance, programs or reprograms the access rights in its internal memory.

The use of acoustic accreditations is not new in itself and has already been proposed in other contexts and for other applications, for example by the WO 2008/107595 A2 (Tagattitude).

This document describes a method of securing the logical access to a computer network by a remote terminal, for example by a computer connected to this network via Internet. The user connects to the network with his computer and simultaneously powers up his phone and, by means of the latter, calls a control site interfaced with the network to which the access is requested. To check the user's authorization, the network sends an audio signal (acoustic accreditation) to the remote computer that has just connected, and this signal is reproduced by the loudspeaker of the computer. The user having placed his phone in front of the loudspeaker, this audio signal is picked up by the phone, transmitted to the remote control site via the mobile phone network operator and "listened to" by the control site, which can then check the accreditation and authorize the access to the computer network by the terminal. It will be observed that, in this case, it is an "upward" accreditation: the acoustic accreditation is picked up by the microphone of the phone, which forwards it to the control site. Knowing the recipient of the phone call, the control site can identify the user through the mobile phone used for that operation, and thus authorize the logical access to the network by the terminal located in the vicinity of the thus-identified phone.

More precisely, the present invention relates to a secured system for controlling the opening of lock devices, comprising, in a manner known in itself: at least one lock device provided with electronic circuits for the conditional control of locking/unlocking mechanical members based on previously defined access rights; a mobile phone at the disposal of a master-user; and a remote management site.

Characteristically of the invention, the remote management site comprises: a database of lock devices and authorized users with, for each lock device, an associated unique identifier, a list of authorized users with corresponding access right data, and possibly additional data; and a generator of accreditation data, the accreditations being encrypted acoustic accreditations in the form of single-use audio signals, adapted for allowing the programming of the lock devices with the access rights indexed in the database and/or with the additional data. Besides, the system comprises means for secured transmission of said accreditation data from the management site to the mobile phone of the master-user, and the phone comprises an electroacoustic transducer capable of reproducing the acoustic accreditations. The lock device comprises an electroacoustic transducer capable of picking up the acoustic accreditations reproduced by the phone's transducer previously placed in the vicinity of the lock device, as well as means for recognizing, analyzing and authenticating the acoustic accreditations picked up by the transducer, and performing a programming of the access rights and/or of the additional data upon recognizing a compliant accreditation.

The means for secured transmission of the accreditation data from the management site to the mobile phone of the master-user may comprise means for coupling this mobile phone with a computer terminal connected to the management site, and/or a mobile network operator coupled to the management site and to the phone of the master-user.

Advantageously, for the generation of accreditation data to be transmitted to the phone, the management site may combine the access right data peculiar to the authorized users with additional data peculiar to the lock and obtained with the management site, and generate an acoustic accreditation that is a function of both said access right data and said additional data.

As an alternative or in addition, the phone may combine the accreditation data transmitted by the management site with additional data inherent to the phone and obtained locally, and generate an acoustic accreditation that is a function of both said accreditation data and said additional data. These additional data can in particular comprise information of geographic location of the phone at the time of the programming operation, the lock device comprising accordingly means for memorizing the information of geographic location at the time of programming, and subsequently comparing such information with information of geographic location of a user's phone at the time of an attempted opening of the lock device by this user.

According to various advantageous subsidiary characteristics:

- the phone is capable of: previously to the reproduction of the access right programming acoustic accreditations, reproducing a specific session initiation accreditation adapted to switch the lock device into a programming mode; and possibly, after the reproduction of the programming acoustic accreditations, reproducing a specific session closing accreditation adapted to switch the lock device out of said programming mode;
- the lock device comprises an electroacoustic transducer capable of reproducing return acoustic signals, generated by the lock device and coded with data peculiar to the lock device, and the phone comprises an electroacoustic transducer capable of picking-up said return signals, as well as means for decoding the return signals and displaying, if need be, to the user, a message based on data peculiar to the lock device, and/or for transmitting to the management site the return signals coded with the data peculiar to the lock device;
- the phone comprises means for memorizing and updating a list of lock devices already programmed and of lock devices not yet programmed;
- the system comprises means for conditioning the reproduction of the acoustic accreditation by the phone's transducer to the previous presentation of a personal validation data delivered by the master-user to the phone.

In a first embodiment, the system comprises means capable of: checking the authorization of the master-user to perform a programming of the lock device; generating an acoustic accreditation by the generator of the management site; and transmitting said accreditation to the phone, for direct reproduction by the transducer of the latter previously placed in the vicinity of the lock device's transducer.

In a second embodiment, the system comprises means capable of: checking the authorization of the master-user to perform a programming of the lock device; generating an acoustic accreditation by the generator of the management site; and activating an internal applet of the phone to download said accreditation and memorize the latter in a memory of the phone; and, in a second time, activating the internal applet for reproducing the accreditation by the phone's transducer previously placed in the vicinity of the lock device's transducer.

In a third embodiment, the phone contains an internal applet forming, in combination with a cryptographic key, a cryptographic generator. In this case, the accreditation data transmitted by the remote management site to the phone is said cryptographic key, so as to allow, upon a request from the master-user, the generation of the acoustic accreditation by the internal applet and the reproduction thereof by the phone's transducer previously placed in the vicinity of the lock device's transducer.

In a fourth embodiment, the system comprises means adapted for: checking the authorization of the master-user to perform a programming of the lock device; generating an acoustic accreditation by the generator of the management site and converting said accreditation into an audio file; transmitting said audio file to the phone for download and memorization into a memory of the phone; and, in a second time, reproducing the audio file by the phone's transducer previously placed in the vicinity of the lock device's transducer.

Various exemplary embodiments of the invention will now be described, with reference to the appended drawings in which same reference numbers designate identical or functionally similar elements through the figures.

Figure 2:
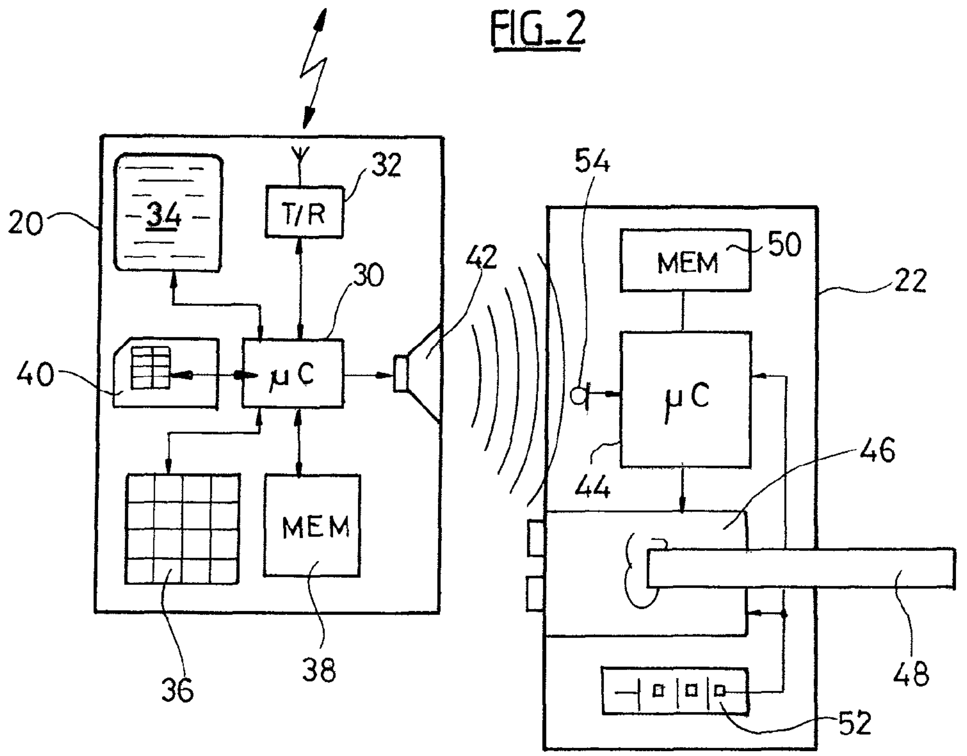

FIG. 1 schematically illustrates the main elements contributing to the operation of the system according to the invention;

FIG. 2 illustrates more precisely, as a block diagram, the main members constituting the mobile phone and the lock to which the latter is coupled:

The principle of implementation of the invention will now be described with reference to FIGS. 1 and 2.

One of the essential elements of the invention is a secured management site 10 centralizing in a database DB 12 the information for inventorying and identifying a number of locks with the access right data associated therewith, comprising a list of authorized users with, for each one, the authorized access conditions: access restricted to certain days or certain time slots, expiry date of an access right, etc.

In addition to the authorized users, the database also indexes for each lock a Unique Identifier, UID, which is uniquely assigned and which permits to identify the lock univocally in the various data exchange protocols. The lock can also be identified by a free name ("front door", "garage door", "cave door", etc.), in particular to facilitate the selection by a user of a lock among other ones, in the same way as a label that would be attached to a conventional key.

Other data can also be stored in the database, in particular the algorithms used by the lock, one or several cryptographic keys, etc.

The management site 10 also comprises a cryptographic motor forming a generator 14 of accreditation data.

Characteristically of the invention, the "accreditation data" (credentials) are encrypted acoustic accreditations in the form of single-use audio signals, for example (but in a non-limitative way) consisted of a succession of double DTMF tones. These audio signals are designed so that they can be conveyed by audio transmission channels and reproduced as such by acoustic transducers.

The programming of a lock firstly involves defining or updating in the database DB the list of the authorized users with, for each one, the corresponding access conditions. These different pieces of information will be communicated to the management site 10 by an authorized operator (hereinafter referred to as "master-user") during an initial phase.

As will be explained latter, the programming may also involve, in addition to determining access rights, updating other pieces of information peculiar to the lock and relating to the operation thereof, such as: date and time, algorithm used for recognizing and decoding the acoustic accreditations, cryptographic key, and free name.

The input by the master-user of the lists of authorized users and the corresponding access rights can be easily performed by means of a micro-computer 16 connected to the management site 10 by a secured connection, for example an IP connection of the https type 18.

The use of a micro-computer 16 is however not essential, and the master-operator can also input the data relating to the access rights by means of his mobile phone 20, the latter operating, during this initial phase, as a terminal connected to the remote management site 10 via a mobile phone operator.

Once the various access right data are input and introduced into the database 12, a corresponding lock 22 has to be programmed or reprogrammed with those access rights, and/or possibly with other pieces of information peculiar to the lock: date and time, algorithms, cryptographic key, free name, etc.

The basic principle of the invention consists in performing said programming by making the loudspeaker of the mobile phone 20 of the master-user reproducing, as an audio signal, an encrypted acoustic accreditation containing the various pieces of information required for the programming, with the mobile phone 20 being brought in the vicinity of the lock 22 that comprises a microphone for picking up this encrypted acoustic accreditation.

The acoustic accreditations, generated by the cryptographic motor 14, can be sent to the mobile phone 20 via the network of the mobile phone operator, or MNO (Mobile Network Operator), 24, which is itself coupled to the management site 10 by a secured connection, for example an IP connection of the https type, or simply through an audio phone gateway PGW (Phone Gate Way) 26 making it possible to convey the acoustic accreditations from the generator 14 to the phone 20 by the audio transmission channels (voice channel) of the mobile phone network. The securing of the connection between the mobile network 24 and the mobile phone 20 may be operated through a Trusted Service Provider, or TSM (Trusted Service Manager), capable of efficiently and securely ensuring the various hereinafter-described procedures of information exchange or download between the management site 10 and the mobile phone 20 of the master-user, via the phone network operator 24.

As an alternative or in addition, the encrypted acoustic accreditations may be transmitted from the management site 10 to the phone 20 via the micro-computer 16, by appropriate coupling means 28 such as: wire (USB cable) or wireless (Bluetooth) connection, via an intermediate storage device (SD or MicroSD card, or USB dongle), or by acoustic coupling between the loud-speaker of the micro-computer and the microphone of the mobile phone 20 (because the acoustic accreditations are in the form of audio signals).

FIG. 2 illustrates, as a block diagram, the main members of the mobile phone 20 and of the lock 22.

The phone 20 comprises a microcontroller 30 coupled to various peripheral members such as emitting/receiving circuit 32, display 34, keyboard 36, data memory 38, UICC card (Universal Integrated Circuit Card, corresponding to the "SIM card" for the GSM phone functions) 40, and acoustic transducer 42.

The lock 22 comprises a microcontroller 44 as well as an electromechanical system 46 for operating the unlocking of a sliding bolt or a handle 48 upon a command from the microcontroller 44. A data memory 50 stores various modifiable data peculiar to the lock, in particular:

- the list of the authorized users, such users being each univocally indexed by a Unique Identifier, UID, of a key consisted of a portable object made available to the authorized user, wherein such object can be—in a non-limitative way—a card or a badge for wireless coupling with the lock (in particular of the RFID type), or a radio or acoustic remote control, or a mobile phone identified by its subscriber number;
- for each user, the authorized access conditions (days or time slots, expiry date of the access right . . . );
- the lock unique identifier UID, which is a programmable identifier, indexed in the database DB of the management site, and which makes it possible to recognize univocally the lock among all the others;
- a free name ("front door", "garage door" . . . );
- recognizing and decoding algorithms;
- cryptographic keys.

The lock comprises its own power supply means, in the form of a battery 52, so as to be electrically autonomous. An external power supply is however possible.

Characteristically, the lock 22 is further provided with an acoustic transducer in the form of a microphone 54 for picking up the surrounding audio signals, in particular the acoustic accreditation that will be reproduced by the loudspeaker 42 of the phone 20, and transforming the picked up acoustic signals into electric signals applied to the microcontroller 44 for decoding, checking and programming or reprogramming in the memory 50 the various above-mentioned modifiable data.

Implementation of the Invention

Various operating modes for implementing the invention with the different elements of the system just described will now be described.

Beforehand, if the lists of authorized users and access rights are not yet in the database DB of the management site 10, or if these data have to be updated, the master-user (or another user accredited by the latter) has to input and communicate them to the management site, by the following successive steps:

1. Secured access (login+password) to the management site 10;
2. Input of the lock UIDs and of the key UIDs of the authorized users;
3. If need be, input of the mobile subscriber numbers of the users authorized to use a mobile phone to open the locks (or even accredited for the programming);
4. Possible allocation of abbreviated names of ports to the lock UIDs and/or of abbreviated names of users to the key UIDs;
5. Allocation of the access rights and conditions to the different users;
6. Validation of the previous inputs;
7. If need be (see hereinafter), delivery by the management site of the uplink call number(s) to be dialed by the master-user to program each lock, wherein such information can also be sent to him by SMS, MMS, e-mail or instantaneous messaging, etc.

When he wants to program or reprogram a lock, the master-user receives from the management site 10 the data that must be written or updated into the memory 50 of the lock 22, via the micro-computer 16 and the coupling 28, or directly via the mobile phone operator 24.

As described above, the data received from the remote management site 10 can comprise, in addition to the access rights attached to each authorized user, a number of pieces of information peculiar to the lock, such as: algorithm used, cryptographic key, abbreviated name, etc. The update can also relate to the date and time of the internal clock of the micro-controller 44, remotely from the management site 10.

The programming data can also comprise data that are peculiar to the mobile phone 20 of the master-user, such as:

- date and time, when such information are desired to be updated from the mobile phone instead of from the management site 10;
- the IMEI number that identifies uniquely the phone;
- the identifier of the UICC card 40 (identifier of the SIM card);
- possibly, geographic location information given the position of the phone 20 at the time of programming (GPS coordinates if the phone is equipped with this function, or approximate location based on the network cell from which the phone emits).

To program the lock, the user places his phone 20 in front of the lock 22 he wants to program and triggers the emission, as an audio signal, of the corresponding acoustic accreditation. This emission may also be triggered (as explained hereinafter) by simply answering or picking up a downlink call to the mobile phone of the master-user from the remote management site.

The acoustic accreditation, picked up by the microphone 54 of the lock, is analyzed by the micro-controller 44 that, in case of compliance, performs the programming or the updating of the corresponding information in the memory 50.

The fact that the encrypted acoustic accreditation is a single-use accreditation avoids any fraud by recording and duplicating the accreditation.

A precaution for increasing the security consists in providing an additional validation by the user, for example the input of a personal code of the "PIN code" type before the delivery of the acoustic accreditation, or a validation of the biometric type, by means of a biometric reader incorporated in the phone or by a voice print recognition system using the phone's microphone (wherein the specific biometric print may be stored in the memory 38 of the phone, or in the UICC card 40, or in the database 12).

Advantageously, the lock 22 is provided with means for emitting in return an acoustic signal validating the good execution of the programming operation.

It is possible to use for that purpose the transducer 54 of the lock by making it operate in a reversed mode (emitting audio signals instead of picking them up), or to provide a specific transducer for reproducing audio signals. The audio signal thus emitted by the lock will be picked up by the microphone of the phone 20 and translated by an applet of the phone into an audio or visual message to the master-user to confirm (or invalidate) the good execution of the programming. The applet may also keep a track of the locks that have been programmed and of those that have not yet been programmed, for example by displaying a list of locks, to alert the master-user if he has forgotten to program some of them.

Advantageously, it is possible to benefit from the return of information after programming the lock to collect data memorized in the latter, or state information such as low battery signal, need for maintenance, dysfunction, opening proof, etc. Such data or information may be translated by the phone's applet into alert messages ("low battery") displayed on the phone's display screen, such messages being repeated if necessary at regular intervals.

Moreover, these data or information will advantageously be able to be sent toward the management site via the mobile network 24, thus taking advantage of the establishment by the master-user of a downlink connection (from the management site to the lock) to return information in the reverse direction (from the lock to the management site). In other words, the master-user, when programming or reprogramming, becomes a source of information for the system. This way to operate is herein particularly advantageous because the locks are of the "stand alone" type, i.e. they operate fully autonomously without being connected to any local network that would permit it to exchange data or to transmit some state or anomaly messages.

Advantageously, before performing the programming itself, the phone 20 reproduces a specific session initiation accreditation, adapted to switch the lock device into a programming mode different from its normal operation. Once the programming is completed, another specific acoustic accreditation switches the lock out of the programming mode, back to its normal operating mode. This way to proceed is particularly advantageous to increase the security when the lock is acoustically controlled, i.e. the subsequent unlocking by an authorized user will be made by emission of an encrypted acoustic accreditation, of similar nature than an acoustic accreditation having served for the programming.

Another improvement aims to avoid a fraud consisting in taking off an already-programmed lock to place it back, as such, at another site. For that purpose, the lock 22 memorizes the geographic location information (GPS coordinates or the like) of the phone 20 at the time the later performs the programming. The lock moreover comprises means for collecting the geographic location information of the phone of the user that will be subsequently considered as an authorized user, and comparing these coordinates to those memorized at the time of programming, and the opening will be authorized only if the information match, within a given margin of error. In the absence of network or GPS cover when the access is requested by the user, the location data used will be the most recent data obtained before the loss of contact, with in this case a higher margin of error, defined by the administrator of the system.

Several ways by which the management site 10 can deliver the accreditation to the mobile phone 20, in particular when this delivery is made via the mobile operator network 24, will now be described.)

1°) In-Line Mode (Direct Delivery of the Accreditation)

When he desires to program the lock 22, the master-user contacts the management site 10 by any suitable means. This may be obtained by calling a phone number, or by a method of the "call-back" type: in this case, the master-user contacts the management site by phone or by a message (SMS, MMS, e-mail, instantaneous messaging, etc.); the management site does not answer immediately but, after the phone has been hung up, it makes the mobile phone 20 ring so that the master-user can once again establish the contact with the site (the number called back by the management site being the subscriber number, indexed in the database DB, of the master-user or of any user authorized by the latter).

If the programming parameters have been previously defined as described hereinabove, the master-user just needs to validate these parameters as well as his mobile phone subscriber number with the management site 10. The simple answer of the management site to the call of the master-user or, in case of call back, the picking up by the latter, causes the immediate and direct transmission of the encrypted acoustic accreditation authorization.

In this embodiment, whatever the way the user enters into contact with the remote site, the latter delivers the acoustic accreditation directly to the user, "in-line", without intermediate storing.

This embodiment is particularly simple to implement, insofar as it just requires the use of the existing infrastructure, without a previous adaptation of the phone, in particular without the need to load an applet, notably of the midlet or cardlet type.

Hence, the invention can be implemented with any type of mobile phone, even a very simple one, and without any previous intervention on the latter. Another advantage lies in the possibility to check in real time the master-user's authorization. Moreover, with this in-line mode, it is possible to have, at the management site, information about the use of the acoustic accreditation, in particular the date and time of programming, and possibly the geographic location of this operation (by identifying the network cell from which the master-user calls).

On the other hand, this mode requires having access to the mobile network, which is not always possible (cellars, non-covered areas, etc.). Moreover, in principle, it does not make it possible to have, for selection by the user, several accreditations corresponding to several possible locks, insofar as it is necessary to have a "one-to-one" match between accreditation and lock.

In case of a plurality of locks, it is possible to provide a step-by-step validation after each lock, or to use a different call number for each lock.

2°) Semi-in-Line Mode (Delayed In-Line Mode with Download)

This mode can be used in particular if the access to the network is not ensured at the moment of use. In this case, the master-user connects in advance to the management site and receives from the latter the acoustic accreditation corresponding to the lock he wants to program, or several of these accreditations, in case of a plurality of locks to be programmed. These accreditations are securely stored in the phone or in a peripheral memory of the phone (for example an SD or MicroSD card).

Herein again, the previous contact with the management site 10 may be established either directly by sending to the site a request emitted by the mobile phone of the master-user, or via a downlink message emitted by the remote management site to a subscriber number previously specified by the master-user (or the number of any other user authorized by the latter).

When the master-user wants to program a lock, he initiates an applet integrated in his phone, which searches for the corresponding accreditation among those that have been stored, reproduces it to program the lock, and cancels it from the memory. And so on, in order to use the following accreditations.

The application providing this implementation is an applet stored in the phone, previously sent to the latter by the mobile network operator, or by being downloaded on an external medium (SD or MicroSD card), or via an Internet connection. In case of download via the mobile network operator, the management site will have beforehand sent a message, for example of the "push SMS" or "WAP push" type, to the phone, in order to identify the brand and model of the latter and to present to the master-user a link for downloading the applet.

3°) Off-Line Mode

In this mode of implementation, the acoustic accreditations are generated locally, by the phone itself. For that purpose, the phone contains an applet, in particular of the cardlet type (stored on the UICC card 40) or midlet type (stored in the memory 38 of the phone). Such applet is downloaded by any suitable means, in the same manner as that used in the previous mode of implementation: download via the mobile operator, via Internet, etc., or pre-loaded in the phone when the latter is acquired.

The management site 10 sends "accreditation data" to the phone 20, such data being no longer the acoustic accreditation itself but a cryptographic key stored in the UICC card 40 for reasons of security. The cryptographic key, combined with the applet, will provide a cryptographic generator within the phone 20. When the master-user desires to program a lock, he triggers the generation of the acoustic generation by the internal applet and the reproduction thereof by the transducer of his phone.

4°) "Attachment File" Mode

This mode of implementation is a variant of the semi-in-line mode.

The difference lies essentially in the fact that the accreditations are not sent by the voice channel of the mobile phone network, but in the form of a file attached to a message of the e-mail, MMS or instantaneous message type.

The advantage of this solution is the use of the file download means pre-existing in the phone, in particular with the phones comprising elaborate functions of the "smartphone" type, and without the need to previously download a specific applet, to store it in the phone and to make it execute by the latter when needed. The file may also be downloaded via the micro-computer 16 and the coupling 28 with the phone 20.

The invention claimed is:

1. A secured system for controlling the opening of lock devices, comprising:

at least one lock device provided with electronic circuits for the conditional control of locking/unlocking mechanical members based on previously defined access rights;

a mobile phone at the disposal of a master-user; and
a remote management site;

the system being characterized in that:

the remote management site comprises:

a database of lock devices and authorized users with, for each lock device, an associated unique identifier and a list of authorized users with corresponding access right data; and a generator of accreditation data, the accreditations being encrypted acoustic accreditations in the form of single-use audio signals, adapted for allowing the programming of the lock devices with the access rights indexed in the database;

the system comprises means for secured transmission of said accreditation data from the remote management site to the mobile phone of the master-user;

the phone comprises an electroacoustic transducer capable of reproducing said acoustic accreditations;

the lock device comprises:

electroacoustic transducer capable of picking up the acoustic accreditations reproduced by the phone's transducer previously placed in the vicinity of the lock device; and means for recognizing, analyzing and authenticating the acoustic accreditations picked up by the transducer, and updating the access rights upon recognizing a compliant accreditation.

2. The system of claim 1, wherein the means for secured transmission of the accreditation data from the management site to the mobile phone of the master-user comprise means for coupling this mobile phone with a computer terminal connected to the management site.

3. The system of claim 1, wherein the means for secured transmission of the accreditation data from the management site to the mobile phone of the master-user comprise a mobile network operator coupled to the management site and to the phone of the master-user.

4. The system of claim 1, wherein, for the generation of accreditation data to be transmitted to the phone, the management site is capable of combining the access right data peculiar to the authorized users with additional data peculiar to the lock and obtained with the management site, and of generating an acoustic accreditation that is a function of both said access right data and said additional data.

5. The system of claim 1, wherein the phone is capable of combining the accreditation data transmitted by the management site with additional data inherent to the phone and obtained locally, and of generating an acoustic accreditation that is a function of both said accreditation data and said additional data.

6. The system of claim 5, wherein said additional data further comprise information of geographic location of the phone at the time of the programming operation, and the lock device further comprises accordingly means for memorizing the information of geographic location at the time of programming, and subsequently comparing such information with information of geographic location of a user's phone at the time of an attempted opening of the lock device by this user.

7. The system of claim 1, wherein the phone is capable of:

previously to the reproduction of the access right programming acoustic accreditations, reproducing a specific session initiation accreditation adapted to switch the lock device into a programming mode; and possibly, after the reproduction of said programming acoustic accreditations, reproducing a specific session closing accreditation adapted to switch the lock device out of said programming mode.

8. The system of claim 1, wherein:

the lock device comprises an electroacoustic transducer capable of reproducing return acoustic signals, generated by the lock device and coded with data peculiar to the lock device, and the phone comprises an electroacoustic transducer capable of picking-up said return signals.

9. The system of claim 8, wherein the phone further comprises means for decoding said return signals and displaying, if need be, to the user, a message based on said data peculiar to the lock device.

10. The system of claim 8, wherein the phone further comprises means for transmitting to the management site said return signals coded with said data peculiar to the lock device.

11. The system of claim 1, wherein the phone further comprises means for memorizing and updating a list of lock devices already programmed and of lock devices not yet programmed.

12. The system of claim 1, further comprising means for conditioning the reproduction of the acoustic accreditation by the phone's transducer to the previous presentation of a personal validation data delivered by the master-user to the phone.

13. The system of claim 1, comprising means capable of:

checking the authorization of the master-user to perform a programming of the lock device;

generating an acoustic accreditation by the generator of the management site; and transmitting said accreditation to the phone, for direct reproduction by the transducer of the latter previously placed in the vicinity of the lock device's transducer.

14. The system of claim 1, comprising means capable of:

checking the authorization of the master-user to perform a programming of the lock device;

generating an acoustic accreditation by the generator of the management site; and activating an internal applet of the phone to download said accreditation and memorize the latter in a memory of the phone;

and, in a second time, activating the internal applet for reproducing the accreditation by the phone's transducer previously placed in the vicinity of the lock device's transducer.

15. The system of claim 1, wherein:

the phone contains an internal applet forming, in combination with a cryptographic key, a cryptographic generator;

the accreditation data transmitted by the remote management site to the phone is said cryptographic key, so as to allow, upon a request from the master-user, the generation of the acoustic accreditation by the internal applet and the reproduction thereof by the phone's transducer previously placed in the vicinity of the lock device's transducer.

16. The system of claim 1, comprising means capable of:

checking the authorization of the master-user to perform a programming of the lock device;

generating an acoustic accreditation by the generator of the management site and converting said accreditation into an audio file;

transmitting said audio file to the phone for download and memorization into a memory of the phone;

and, in a second time, reproducing the audio file by the phone's transducer previously placed in the vicinity of the lock device's transducer.

* * * * *